May 7, 1929.  W. M. MADISON  1,711,897
MOTION PICTURE SCREEN
Filed Dec. 28, 1926
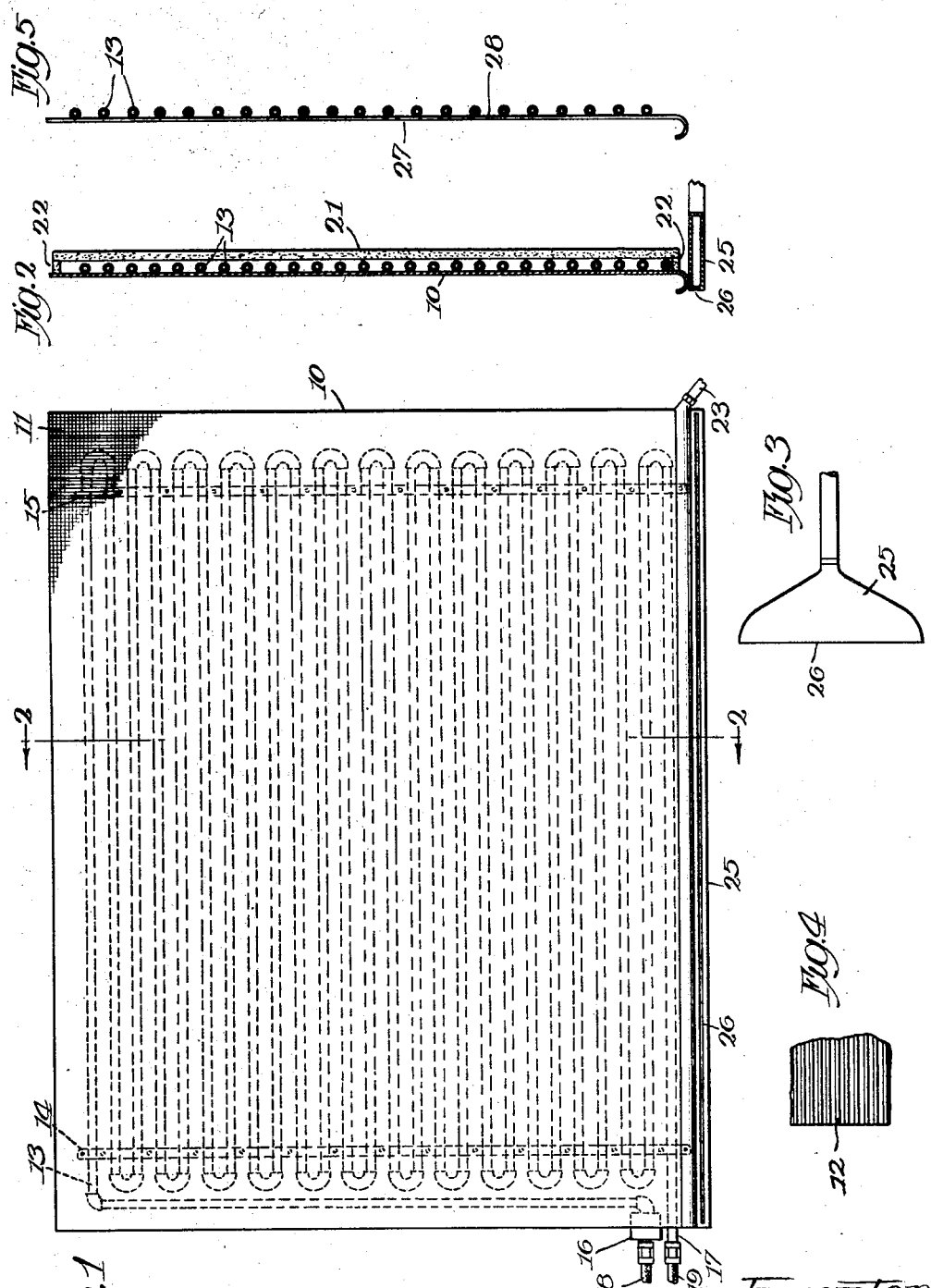
Inventor:
William M. Madison
By Gillson, Mann & Cox Attys.

Patented May 7, 1929.

1,711,897

UNITED STATES PATENT OFFICE.

WILLIAM M. MADISON, OF CHICAGO, ILLINOIS.

MOTION-PICTURE SCREEN.

Application filed December 28, 1926. Serial No. 157,485.

This invention relates to screens and more particularly to screens or surfaces on which images from motion picture and stereopticon machines and the like may be projected.

One of the objects of the invention is the provision of a new and improved motion picture screen in which the image receiving surface is readily and easily applied to, or removed from the screen.

Another object of the invention is the provision of a motion picture screen having a new and improved surface on which images from motion picture and stereopticon machines and the like are adapted to be projected.

A further object of the invention is the provision of new and improved means for cleaning the surfaces of motion picture screens and the like.

Another object of the invention is the provision of a motion picture screen having means for causing the surface of the same to be covered with tiny crystals for producing a clean even uniform surface upon which the pictures may be projected.

A still further object of the invention is the provision of a new and improved screen with means for frosting the picture receiving surface, that is cheap to manufacture, simple in construction, easily assembled and installed, efficient in use and that is not likely to become deranged or get out of order.

Other and further objects and advantages of the invention will appear from the following description taken in connection with the accompanying drawings, in which Fig. 1 is a front elevation of the screen with parts broken away.

Fig. 2 is a vertical section on line 2—2 of Fig. 1.

Fig. 3 is a plan view of the air nozzle, on a reduced scale.

Fig. 4 is a fragment of a screen showing a modified form of surface.

Fig. 5 is an edge view of a modified form of the screen.

It is well known that screens of smooth surfaces do not display motion pictures to the best advantage because of the glare and the single plane effect it gives to the picture. Screens having their surfaces irregular or roughened, gives the picture a more or less perspective appearance. It has been found by experiment that if the motion pictures be projected on a surface covered with frost, snow or crystals the projected picture will more nearly appear in a true perspective.

The present invention seeks to avoid the one plane appearance of the picture by providing means for frosting the surface of the screen. The effect is heightened by roughening the picture receiving surface of the screen.

In the form of the device selected to illustrate one embodiment of the invention, the reference character 10 designates a screen which is of a material that is a good conductor of heat, as sheet metal. The screen is preferably though not necessarily embossed, corrugated or otherwise roughened, or rendered uneven, on the picture receiving surface, as indicated at 11 on Fig. 1, in which the embossed figures are in the form of rectangles, or as indicated in Fig. 4 in which the surface is corrugated as indicated at 12.

Suitable means are provided for lowering the temperature of the screen whereby moisture in the air coming in contact with the screen will be congealed on the picture projecting surface in the form of frost or aqueous crystals. Any suitable means may be employed for this purpose. As shown, the expansion pipe or coil 13 of a refrigerating machine is employed for this purpose. The expansion pipe 13 may be arranged in any suitable manner. As shown, it is sinuous or reversely looped and is attached to the back of the screen or metal plate, as by means of the clips 14 and 15.

Any suitable means may be employed for condensing the refrigerant. Since the mechanism for condensing the refrigerant and for expanding the same in the coil or pipe 13 constitutes no part of the present invention, it is not thought necessary to illustrate or describe the same, further than to state that the refrigerant enters the expansion pipe or coil through an expansion valve 16 at one end of the pipe, and the refrigerant vapor is withdrawn through the other end of the pipe 17 in the usual manner. The end of the expansion pipe or coil 13 is connected to the refrigerating machine by means of flexible tubes 18 and 19, of sufficient length to permit the screen when installed, to be raised and lowered in the usual manner.

Preferably though not necessarily, a plate 21 of insulating material is placed over the back of the coil 13 for enclosing the same. Strips of insulating material 22 extend around the edges of the screen, and are connected to the screen and the back plate 21 in order to form a completely air tight enclosure for the expansion pipe or coil, whereby the heat absorbed in the expansion of the refrigerant will be taken solely from the screen, thereby rapidly lowering the temperature of the same below the freezing point.

In the operation of the device, the refrigerating machine is started up a few minutes before the screen is to be employed, in order to cause the screen to become frosted or covered with crystals, after which, the machine is run just sufficient in order to maintain the screen at a desired temperature. After the screen has become frosted, it is in condition to have the pictures projected thereon.

After the exhibition or show, the refrigerating machine is stopped and the temperature of the room will melt the frost or crystals and the water flowing across the surface of the screen will cleanse the same of dirt, dust, and other foreign matter.

The lower end of the screen may be, and preferably is curved forwardly to provide a trough or conduit for collecting the water, and conducting the same to a suitable drain. Preferably one end of the trough is slightly higher than the other, so that the water will run to the opposite end of the trough. The lower end of the trough is provided with a drain pipe 23 for conducting the water to the sewer.

In projecting pictures showing winter scenes or scenes displaying ice and snow, a touch of realism may be added to the pictures by directing a light breeze of cool air forwardly from the screen in the faces of the spectators.

The frosting on the screen will cause a circulation of the air adjacent to the screen. The air in coming in contact with the screen will become chilled and will flow down the screen due to its increased weight. By providing means at the lower portion of the screen for directing a stream of air outwardly, the cold air flowing down the screen may be projected forwardly therefrom. This cool air may be utilized not only to enhance the optical illusion of snow scenes and the like, but may be used also to great advantage in cooling the theater or enclosure during the warm seasons of the year.

Any suitable means may be employed for throwing a stream of air forwardly from below the screen. In the form of the device selected to illustrate one embodiment of the invention, a nozzle 25 is extended along the lower portion of the screen. The nozzle is provided with a suitable slot 26 directed forwardly from the screen, through which air introduced into said nozzle under pressure is adapted to escape and carry with it, the cool air flowing down the front surface of the screen.

If desired, the nozzle 25 may be rigidly connected to the lower portion of the screen, whereby said nozzle will remain in a more or less cool condition, due to the fact that it is in intimate contact with the frosted screen 10, whereby the air passing through said pipe will be more or less cooled.

The form of the device shown in Fig. 5 differs from that just described in that the front 27 of the screen 28 is substantially smooth, and no means are provided at its back for enclosing the expansion pipe or coil 13. The air tube may be omitted in this form of the device. The screen is otherwise the same as that disclosed in Figs. 1 and 2, and functions in substantially the same manner.

It is thought from the foregoing taken in connection with the accompanying drawings that the construction and operation of my device will be apparent to those skilled in the art, and that changes in size, shape, proportion and details of construction may be made without departing from the spirit and scope of the appended claims.

I claim as my invention:

1. A motion picture screen comprising a sheet of metal and an expansion pipe of a refrigerator attached to the back of said screen for cooling said screen below frost forming temperature, said pipe having portions arranged comparatively close together over substantially the entire area of the back of said screen and in heat conducting contact therewith, substantially throughout the lengths of said portions.

2. A motion picture screen, comprising a metallic sheet, means for frosting said sheet, a nozzle beneath said sheet provided with openings directed forwardly from said screen, whereby air delivered under pressure to said nozzle will issue through said openings and be directed forwardly from said screen.

In testimony whereof I affix my signature.

WILLIAM M. MADISON.